Patented Apr. 16, 1946

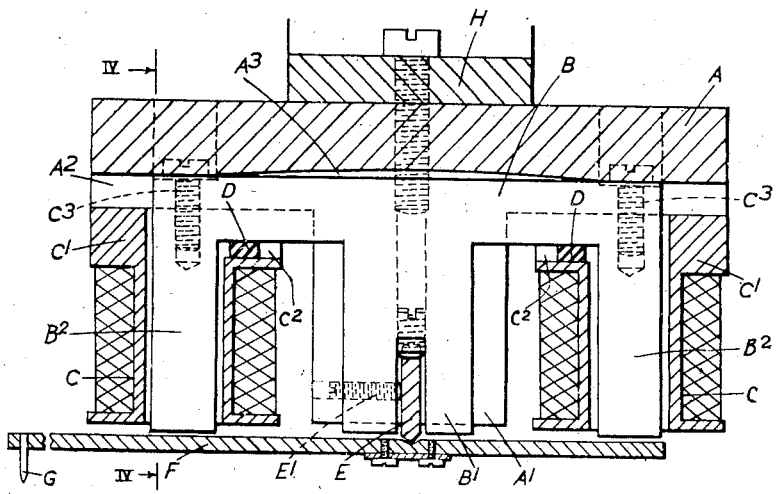
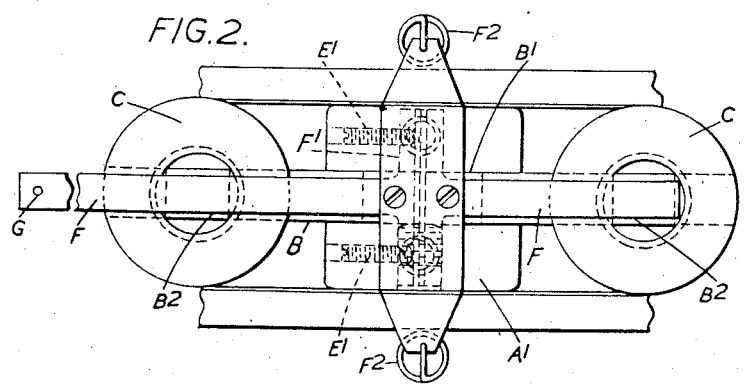
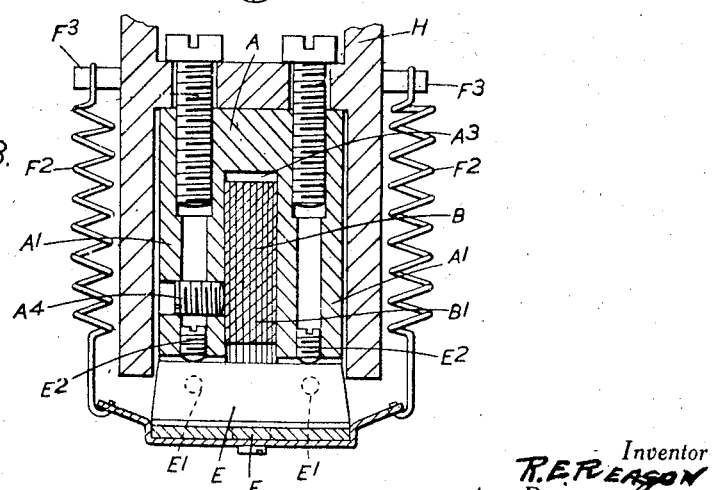

2,398,666

UNITED STATES PATENT OFFICE 2,398,666

APPARATUS FOR MEASURING OR INDICATING THE ROUGHNESS OR UNDULATIONS OF A SURFACE

Richard Edmund Reason, Leicester, England, assignor to Taylor, Taylor & Hobson Limited, Leicester, England, a company of Great Britain Application May 25, 1943, Serial No. 488,418
In Great Britain April 27, 1942

7 Claims. (Cl. 73—105)

This invention relates to apparatus for measuring or indicating the roughnesses or undulations of a surface, of the kind in which a stylus, traversed over the surface, is carried by the armature of a differential electromagnetic detector device acting to transform the movements of the stylus approximately normal to the surface into electrical energy for controlling a measuring or indicating device, and has more especial reference to the construction of the detector device in such apparatus.

It will be appreciated that the detector device in such apparatus must be sensitive to very minute movements of the stylus, and it is of great importance therefore that no errors in the electrical output of the device should be produced by inaccuracies in the device itself or by the variations due to extraneous vibrations. The present invention has for its object to provide a satisfactory mounting for the parts of the device which will ensure accuracy in the device itself and freedom from risk of relative movement of parts of the device as the result of external shocks or vibrations.

The detector device according to the present invention comprises a non-magnetic supporting framework, a magnetic core formed of E-shaped laminations, and two coils respectively surrounding the outer limbs of the core, the laminations being clamped in position in the framework by securing the coil bobbins to the framework.

Conveniently the coil bobbins are threaded over the outer limbs of the core and are secured to the framework on both sides of the core. In order to provide for any slight inaccuracies in the dimensions of the laminations, as may arise from the stamping process by which they will usually be made, resilient pads are preferably inserted between the inner portions of the coil bobbins and the edges of the laminations with which they engage between the limbs of the core, so that the clamping pressure is exerted on the laminations through such pads. It will be appreciated that stamping inaccuracies in the effective widths of the laminations will normally be materially smaller than the thicknesses of the laminations, so that the resilient pads will each adjust themselves generally to the shape of the surface formed by the edges of the stack of laminations and will thus ensure that the clamping pressure is applied to each individual lamination, thereby preventing any tendency of the laminations to slide relatively to each other and thus to introduce slight variations in the magnetic circuits.

It is important for the same reason that the clamping forces exerted on the laminations both to hold them together in a close stack and to hold the stack in position in the framework should be symmetrical with respect to the two magnetic circuits linked respectively with the two coils. Thus for instance the clamping means acting transversely to hold the laminations in a close stack may consist of one or more grub screws located in the plane of symmetry through the middle of the centre limb of the core of a floating lever pressed by a grub screw at its centre point and engaging with the surface of the end lamination at points equally spaced from such plane of symmetry.

The framework may conveniently be generally of T-shape, with a longitudinal slot dividing the leg of the T for receiving the laminations of the core, the centre limb of which lies between the two parts of the leg of the T. A knife-edge forming a pivot for the armature of the device is preferably secured in a small transverse slot in the divided leg of the T-shaped framework, such knife-edge also passing through a slot in the centre limb of the core.

A preferred practical construction of differential detector device according to the invention is illustrated by way of example in the accompanying drawings, in which Figure 1 is a central longitudinal section through the device.

Figure 2 is a view of the device from beneath.

Figure 3 is a central transverse section.

Figure 5:
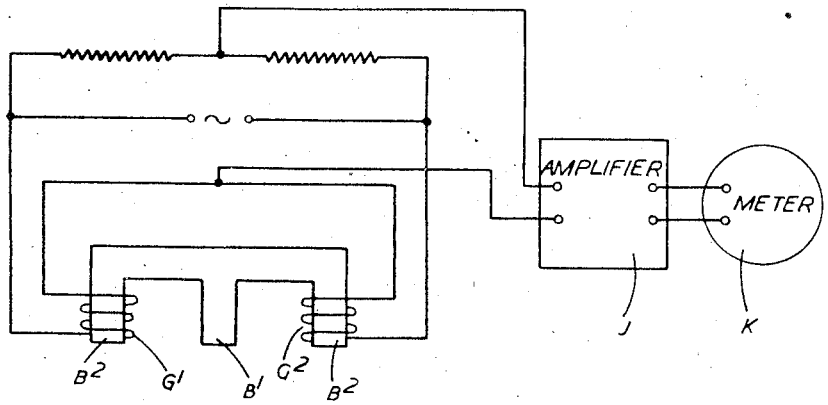
Figure 5 is a schematic wiring diagram.
Figure 4:
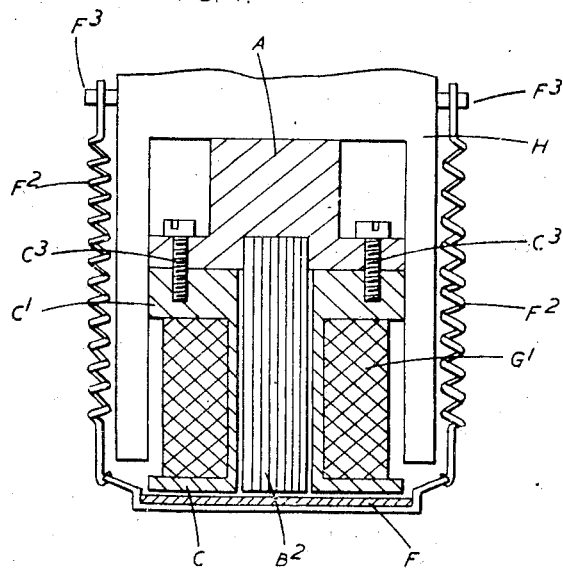
Figure 4 is a sectional view taken on line IV—IV of Figure 1.

In this construction the supporting framework A of the device, which may be made of brass or other non-magnetic material, is generally of T-shape in side view with the leg $A^1$ of the T divided so that the framework appears of U-shape in end view. The longitudinal slot dividing the leg of the T extends through the whole of the leg of the T and for a short distance into the cross-bar of the T, which thus has a shallow groove indicate at $A^2$ running from end to end, this groove being slightly deeper in its middle portion $A^3$ close to the leg of the T than at its ends.

The core B of the device is formed of a stack of E-shaped laminations, consisting of stampings of high permeability metal, the stack being housed in the longitudinal slot $A^2$ of the framework with the centre limb $B^1$ of the E located between the two parts of the divided leg $A^1$ of the framework A and the two outer limbs B² projecting from near the ends of the base of the framework. The laminations are held together in a close stack by means of a grub screw A⁴, passing through one of the two parts of the divided leg A¹ of the framework, so as to engage the surface of the end lamination of the stack at a point lying midway in the width of the centre limb B¹.

Two equal coils wound on flanged cylindrical bobbins C are threaded respectively over the two outer limbs B² of the core. The inner flange C¹ of each bobbin is slotted at C² on the side nearer the centre limb B¹ of the core, this slot C² engaging over the stack of the laminations. A resilient pad D of rubber is inserted in each of these slots C² to engage with the edges of the laminations, and the bobbins are each secured to the crossbar of the framework A by two screws C³ engaging the inner flange C¹ of the bobbin one on either side of the core B. The laminations are thus held in place in the framework A by the bobbins C, the clamping pressure being applied through the rubber pads D which adjust themselves so that each individual lamination is pressed into engagement in the slot A² in the cross bar of the framework. The bottom of such slot A² is so shaped as to afford abutments for the clamping pressure immediately opposite the points at which the pressure is applied, thus avoiding any bending stresses in the laminations due to the clamping pressure.

The clamping of the laminations in both directions is thus wholly symmetrical about the centre plane of the centre limb B¹ of the core, thereby ensuring proper equality between the fixed portions of the two magnetic circuits respectively linked with the two coils. The coils (not shown in Figure 2) are wound in such directions that the magnetic fluxes due to them flow in the same direction through the centre limb B¹ of the core, and the fixed portion of the magnetic circuit linked with each coil thus consists of the U formed by one outer limb B² and the centre limb B¹ of the core.

The free ends of the two parts of the leg A¹ of the framework are slotted in a direction at right angles to the plane of each lamination, and a knife-edge E is secured in this slot in the plane of symmetry of the core by means of screws E¹ through the two parts of the framework leg. The free end of the centre limb of the core is slotted to clear the knife-edge. The operative edge of this knife-edge E projects slightly beyond the free ends of the core limb B¹ and the framework leg A¹ and constitutes a pivot for the armature of the device. Two grub screws E² inserted through holes in the crossbar of the framework A press against the back of the knife-edge E and thus enable it to be adjusted into exactly the desired position.

The armature F is in the form of a bar of suitable length extending close to the free ends of the outer limbs B¹ of the core and having a small crosspiece F¹ adjacent to the end of the central limb. This crosspiece is provided with a V-groove in which the knife-edge E engages, a pair of tension springs F² anchored at F³ one on either side of the leg of the framework acting to hold the armature against its knife-edge pivot. The armature carries at one end a stylus G which can engage with the surface to be investigated. Thus operative movements of the stylus normal or approximately normal to such surface will cause the armature to move closer to one outer limb B² of the core and correspondingly further away from the outer limb, thus increasing the reluctance of one magnetic circuit and correspondingly decreasing that of the other.

The whole detector device is mounted by securing the crossbar of the framework A to a bracket H in the pick-up head of the apparatus, which may be otherwise arranged in the manner described in one or other of the specifications of U. S. A. patent application Serial No. 381,920, filed March 12, 1941, and Patents No. 2,344,217 and No. 2,329,084, the electric circuits being appropriately modified to suit the use of two coils in the detector device instead of three. In the schematic diagram illustrated by Fig. 5, G¹ and G² constitute the two coils, g is an amplifier and k is an electric meter. It will be appreciated that a third coil could if desired be mounted around the centre limb B¹ of the core, in which case the electric circuits could be arranged exactly in the manner described in such specification. It will however be understood that the present invention is not limited to any particular way of electrically controlling the measuring or indicating device from the output of the detector device. Details of construction of the new detector device may also be modified in various ways within the scope of the invention.

What I claim as my invention and desire to secure by Letters Patent is:

1. For use in apparatus for measuring or indicating the roughnesses or undulations of a surface, of the kind in which a stylus is traversed over the surface and its movements approximately normal to the surface during such traversing are utilised electrically to control a measuring or indicating instrument, a differential electromagnetic detector device comprising a non-magnetic supporting framework, a magnetic core formed of E-shaped laminations, two bobbins carrying the coils of the device and respectively surrounding the outer limbs of the core, means for applying a clamping force to the bobbins and framework in the direction of the length of the limbs of the core thereby gripping the crossbar of the core between them in a direction edgewise to said laminations, and an armature cooperating with the core and carrying the stylus.

2. A detector device as claimed in claim 1, in which the coil bobbins are secured to the framework symmetrically on both sides of the core.

3. The apparatus as set forth in claim 1, having resilient pads inserted between the inner portions of the coil bobbins and the portions of the edges of the laminations between the limbs of the core, whereby the clamping pressure is exerted on the laminations through such pads.

4. A detector device as claimed in claim 1, in which the clamping forces exerted on the laminations both to hold them together in a close stack and to hold the stack in position in the framework are symmetrical with respect to the two magnetic circuits is linked respectively with the two coils.

5. A detector device as claimed in claim 1, in which the framework is generally of T-shape, with a longitudinal slot dividing the leg of the T for receiving the laminations of the core, the centre limb of which lies between the two parts of the leg of the T.

6. The apparatus as set forth in claim 1, having a knife edge constituting a pivot for the armature of the device and passing through a transverse slot in the centre limb of the core, and means for securing the knife edge to the framework.

7. The apparatus as set forth in claim 1, in which the center limb of the core is slotted, a knife edge constituting a pivot for the armature of the device and passing through a transverse slot in the centre limb of the core, and means for securing the knife edge to the framework, said framework being generally of T-shape with a longitudinal slot dividing the leg of the T for receiving the laminations of the core, the centre limb of which lies between the two parts of the leg of the T, the knife edge being secured within a transverse slot in the divided leg of the framework.

RICHARD EDMUND REASON.